United States Patent
Suzuki (10) Patent No.: US 12,462,866 B2
(45) Date of Patent: Nov. 4, 2025

(54) SEMICONDUCTOR DEVICE AND CONTROL METHOD FOR SEMICONDUCTOR DEVICE

(71) Applicant: Renesas Electronics Corporation, Tokyo (JP)

(72) Inventor: Shigeyuki Suzuki, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 171 days.

(21) Appl. No.: 18/515,210

(22) Filed: Nov. 20, 2023

(65) Prior Publication Data
US 2024/0170045 A1 May 23, 2024

(30) Foreign Application Priority Data
Nov. 21, 2022 (JP) .................. 2022-185746

(51) Int. Cl.
*G11C 11/4076* (2006.01)

(52) U.S. Cl.
CPC ................. *G11C 11/4076* (2013.01)

(58) Field of Classification Search
CPC ............ G11C 11/4076; G11C 11/4093; G11C 11/409; G11C 7/1078; G11C 11/4096; G06F 3/061
USPC .......................................................... 365/193
See application file for complete search history.

(56) References Cited

U.S. PATENT DOCUMENTS

| 9,263,103 | B2 | 2/2016 | Giovannini et al. | |
| 2016/0049183 | A1* | 2/2016 | Bose | G11C 7/222 |
| | | | | 365/193 |
| 2019/0156874 | A1* | 5/2019 | Jeon | G11C 7/222 |
| 2021/0295930 | A1* | 9/2021 | Watanabe | G11C 7/222 |
| 2022/0270665 | A1* | 8/2022 | Park | G11C 29/022 |

FOREIGN PATENT DOCUMENTS

JP 2015-043254 A 3/2015

* cited by examiner

*Primary Examiner* — Amir Zarabian
(74) *Attorney, Agent, or Firm* — Rimon P.C.

(57) ABSTRACT

A data signal reception circuit output a binary level data signal by comparing the data signal with a reference potential in a reference potential storage unit. A data strobe signal reception circuit outputs a binary level data strobe signal by comparing one and the other of differential data strobe signals. A control circuit adjusts the reference potential by initial training, causes the reference potential storage unit to store the adjusted reference potential, and updates the reference potential in the reference potential storage unit based on an intermediate potential between one and the other of the differential data strobe signals at a time of the initial training and an intermediate potential between one and the other of the differential data strobe signals at a time of data reading.

13 Claims, 12 Drawing Sheets

SEMICONDUCTOR DEVICE AND CONTROL METHOD FOR SEMICONDUCTOR DEVICE

CROSS-REFERENCE TO RELATED APPLICATIONS

The present application claims priority from Japanese Patent Application No. 2022-185746 filed on Nov. 21, 2022, the content of which is hereby incorporated by reference to this application.

BACKGROUND

The present disclosure relates to a semiconductor device and a control method for a semiconductor device.

There is a disclosed technique listed below. [Patent Document 1]: Japanese Unexamined Patent Application Publication No. 2015-43254

Devices with a training function for calibrating timing of signals required to perform memory write operations have been conventionally. For example, a device disclosed in Patent Document 1 adjusts a timing relationship between a data strobe signal and a data strobe enable signal.

SUMMARY

When a temperature or a power supply voltage changes, a window of a data signal DQ changes. If an effective window width of the data signal DQ becomes narrower due to speeding-up of a semiconductor device, there is a possibility that the data signal DQ will be unable to be received correctly.

Other problems and novel features will be apparent from the description of the present specification and the accompanying drawings.

According to one embodiment, a control circuit adjusts a reference potential by initial training, causes a reference potential storage unit to store the adjusted reference potential, and updates the reference potential in the reference potential storage unit based on an intermediate potential between one and the other of differential data strobe signals at a time of the initial training and an intermediate potential between one and the other of the differential data strobe signals at a time of data reading.

According to one embodiment, the data signal DQ can be received correctly.

BRIEF DESCRIPTION OF THE DRAWINGS

FIGS. 4A to 4J are diagrams for explaining an outline of training in the reference example.

FIGS. 11A to 11F are diagrams for explaining an example in which a reference potential d[i] in a register 2(*i*) is updated.

DETAILED DESCRIPTION

Hereinafter, embodiments will be described with reference to the drawings.

First Embodiment

Figure 1:
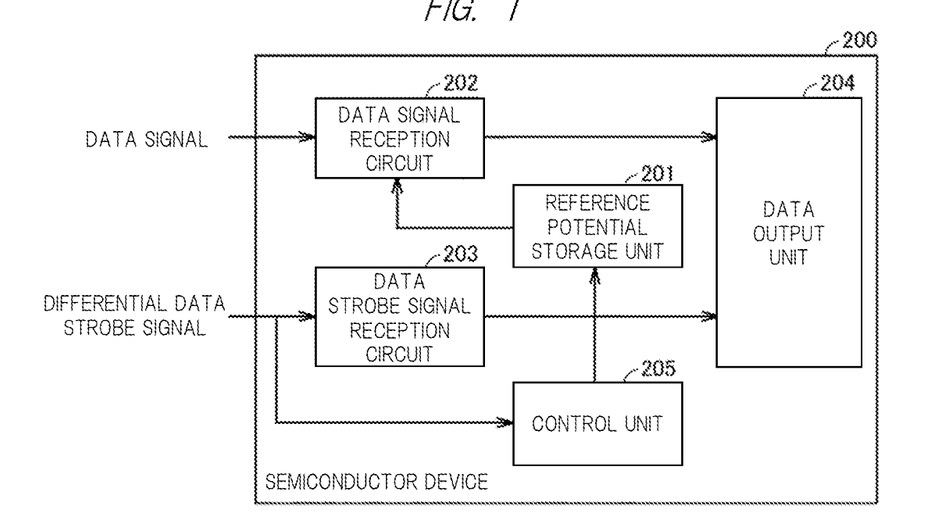
FIG. 1 is a diagram representing a configuration of a semiconductor device according to a first embodiment.

FIG. 1 is a diagram representing a configuration of a semiconductor device 200 according to a first embodiment.

This semiconductor device 200 includes a reference potential storage unit 201, a data signal reception circuit 202, a data strobe signal reception circuit 203, a data output unit 204, and a control circuit 205.

The reference potential storage unit 201 stores a reference potential of a data signal.

The data signal reception circuit 202 outputs a binary level data signal by comparing the data signal with the reference potential stored in the reference potential storage unit 201.

The data strobe signal reception circuit 203 outputs a binary level data strobe signal by comparing one and the other of differential data strobe signals.

The data output unit 204 samples an output signal of the data signal reception circuit 202 based on an output signal of the data strobe signal reception circuit 203.

The control circuit 205 adjusts the reference potential by initial training, causes the reference potential storage unit 201 to store the adjusted reference potential, and updates the reference potential stored in the reference potential storage unit 201 based on an intermediate potential between one and the other of the differential data strobe signals at a timed of the initial training and an intermediate potential between one and the other of the differential data strobe signals at a time of data reading.

For example, the control circuit 205 may update the reference potential stored in the reference potential storage unit 201 by a multiplication result of a ratio and the reference potential adjusted by the initial training, the ratio being a ratio of the intermediate potential between one and the other of the differential data strobe signals at the time of the initial training and the intermediate potential between one and the other of the differential data strobe signals at the time of the data reading.

Alternatively, the control circuit 205 may update the reference potential stored in the reference potential storage unit 201 by an addition result of a difference and the reference potential adjusted by the initial training, the difference being a difference between the intermediate potential between one and the other of the differential data strobe signals at the time of the initial training and the intermediate potential between one and the other of the differential data strobe signals at the time of the data reading.

Figure 2:
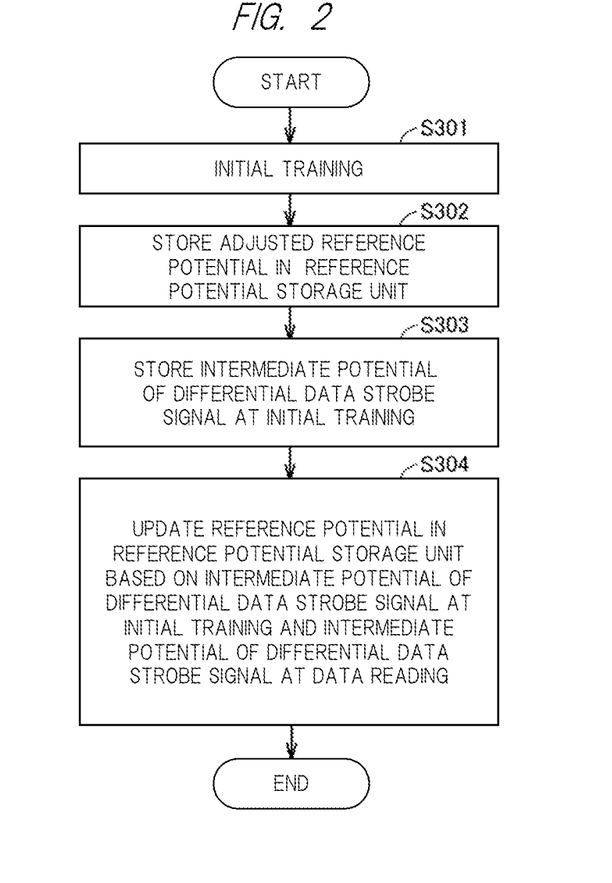
FIG. 2 is a flow chart representing an adjustment procedure of a reference potential of the semiconductor device according to the first embodiment.

FIG. 2 is a flowchart representing a control method for the semiconductor device 200 of the first embodiment.

In step S301, the control circuit 205 adjusts the reference potential and a delay amount by the initial training.

In step S302, the control circuit 205 causes the reference potential storage unit 201 to store the adjusted reference potential.

In step S303, the control circuit 205 stores the intermediate potential between one and the other of the differential data strobe signals at the time of the initial training.

In step S304, the control circuit 205 updates the reference potential stored in the reference potential storage unit 201 based on the intermediate potential between one and the other of the stored differential data strobe signals at the time of the initial training and the intermediate potential between one and the other of the stored differential data strobe signals at the time of the data reading.

For example, the control circuit 205 may update the reference potential stored in the reference potential storage unit 201 by the multiplication result of the ratio and the reference potential adjusted by the initial training, the ratio being a ratio of the intermediate potential between one and the other of the stored differential data strobe signals at the time of the initial training and the intermediate potential between one and the other of the stored differential data strobe signals at the time of the data reading.

Alternatively, the control unit 205 may update the reference potential stored in the reference potential storage unit 201 by the addition result of the difference and the reference potential adjusted by the initial training, the difference being a difference between the intermediate potential between one and the other of the stored differential data strobe signals at the time of the initial training and the intermediate potential between one and the other of the stored differential data strobe signals at the time of the data reading.

Reference Example

Figure 3:
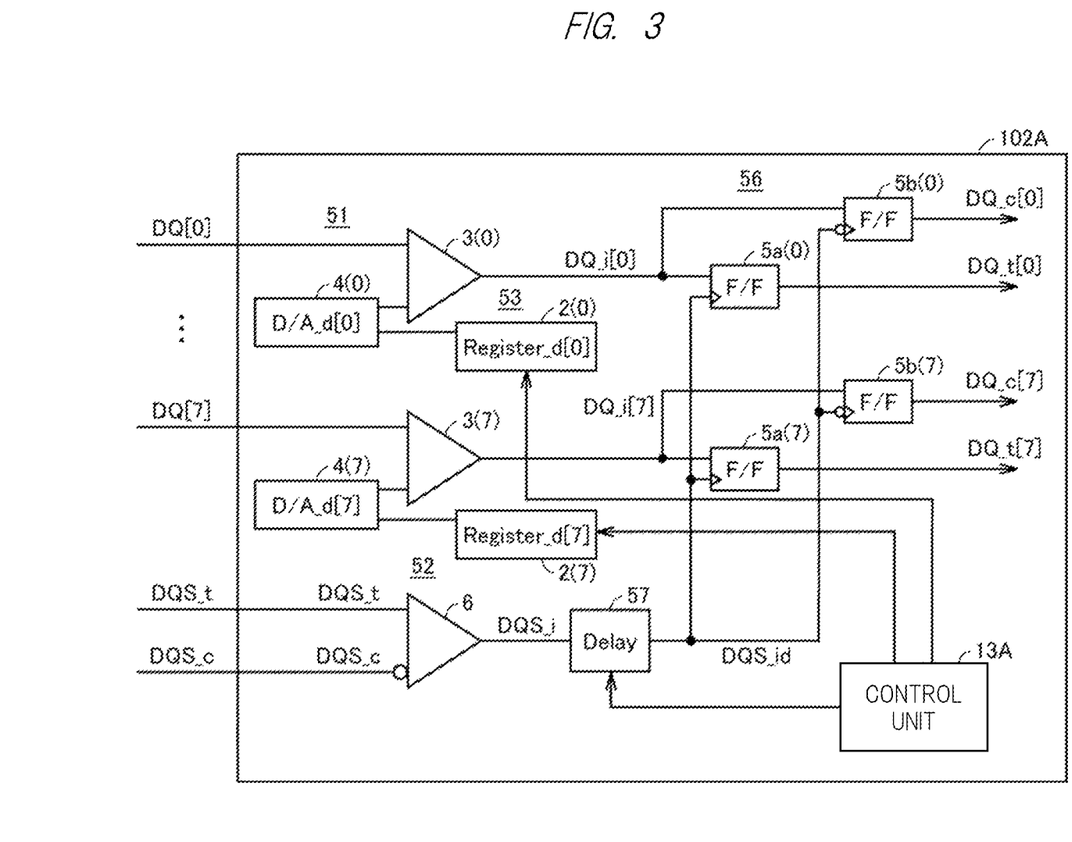
FIG. 3 is a diagram representing a configuration of a DDR-PHY 102A of a reference example.

FIG. 3 is a diagram representing a configuration of a DDR-PHY 102A of a reference example.

A DDR-PHY 102A includes a data signal reception circuit 51, a data strobe signal reception circuit 52, a delay circuit 57, a reference potential storage unit 53, a control circuit 13A, and a data output unit 56.

The reference potential storage unit 53 includes registers 2(0) to 2(7). The register 2(j) stores a reference potential d[0] (j=0 to 7).

The data signal reception circuit 51 includes D/A conversion circuits 4(0) to 4(7) and receivers 3(1) to 3(7).

The D/A conversion circuit 4(j) converts the reference potential d[j] in the register 2(j) into an analog reference potential Ad[j] (j=0 to 7).

The receiver 3(j) compares a data signal DQ[j] with the analog reference potential Ad[j]. The receiver 3(j) outputs a binary level data signal DQ_i[j] representing a high level ("1") when magnitude of the data signal DQ[j] is larger than magnitude of the analog reference potential Ad[j](j=0 to 7). The receiver 3(j) outputs the binary level data signal DQ_i[j] representing a low level ("0") when the magnitude of the data signal DQ[j] is smaller than the magnitude of the analog reference potential Ad[j] (j=0 to 7).

The data strobe signal receiving circuit 52 includes a receiver 6.

The receiver 6 compares differential data strobe signals DQS_t and DQS_c, and outputs a binary level data strobe signal DQS_i representing the high level ("1") when the magnitude of DQS_t is larger than the magnitude of DQS_c, and representing the low level ("0") when the magnitude of DQS_t is smaller than the magnitude of DQS_c.

The delay circuit 57 delays a binary level data strobe signal DQS_i only by a delay amount Delay, and outputs a delayed data strobe signal DQS_id.

The data output unit 56 includes rise flip-flops 5a(0) to 5a(7) and fall flip-flops 5b(0) to 5b(7).

The rise flip-flop 5a(j) latches (samples) the binary level data signal DQ_i[j] at rising timing of the delayed data strobe signal DQS_id, and outputs DQ_t[j] (j=0 to 7).

The fall flip-flop 5b(j) latches (samples) the binary level data signal DQ_i[j] at falling timing of the delayed data strobe signal DQS_id, and outputs DQ_c[j] (j=0 to 7).

The control circuit 13A controls the initial training, adjustment of the reference potential at the time of the data reading, and the like.

FIGS. 4A to 4J are diagrams for explaining an outline of training of the reference example. FIGS. 4A to 4E represent temporal changes in an Eye opening when the DDR-PHY 102A operates at 3200 Mbps, for example. FIGS. 4F to 4J represent temporal changes in an Eye opening when the DDR-PHY 102A operates at 4266 Mbps, for example.

Figure 4A:
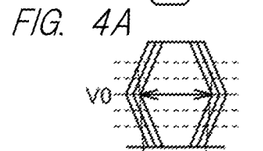
Figure 4B:
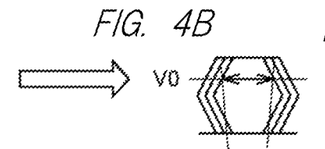
Figure 4C:
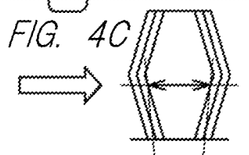
Figure 4D:
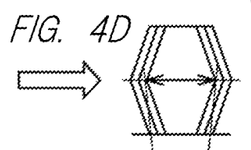
Figure 4E:
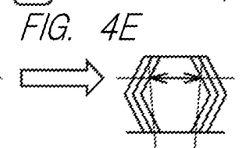
Figure 4F:
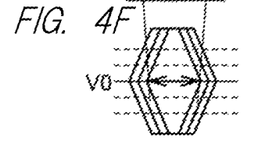
Figure 4G:
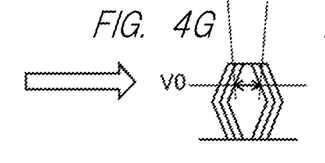
Figure 4H:
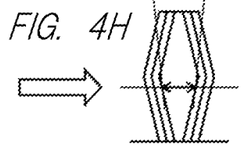
Figure 4I:
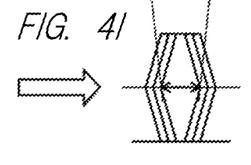
Figure 4J:
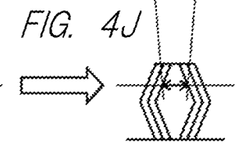

In the initial training, a reference potential Vref (=Ad[i]: i=1 to 7) and the delay amount of the data strobe signal are adjusted. During the periodic training, the delay amount of the data strobe signal is adjusted, but the reference potential Vref is not adjusted.

As shown in FIGS. 4A and 4F, the optimum reference potential is searched for by the initial training. The optimum reference potential V0 is a value having the largest width in a window of the data signal DQ.

Thereafter, the data signal DQ changes due to an influence of changes in temperature or power supply voltage, and a shape of the window (Eye opening) of the data signal DQ changes. Since the reference potential Vref is not adjusted, the window (Eye opening) of the data signal DQ no longer has the largest width at the reference potential V0.

In FIGS. 4B to 4E, even if the shape of the Eye opening changes due to the changes in temperature or power supply voltage, the DDR-PHY 102A operates at a low speed, so that the Eye opening necessary for receiving the data signal DQ is ensured. In FIGS. 4G to 4J, since the DDR-PHY 102A operates at a high speed, a width of an Eye in a time axis direction becomes narrower and when the shape of the Eye opening changes due to the changes in temperature or power supply voltage, the Eye opening necessary for receiving the data signal DQ is not ensured.

Figure 5:
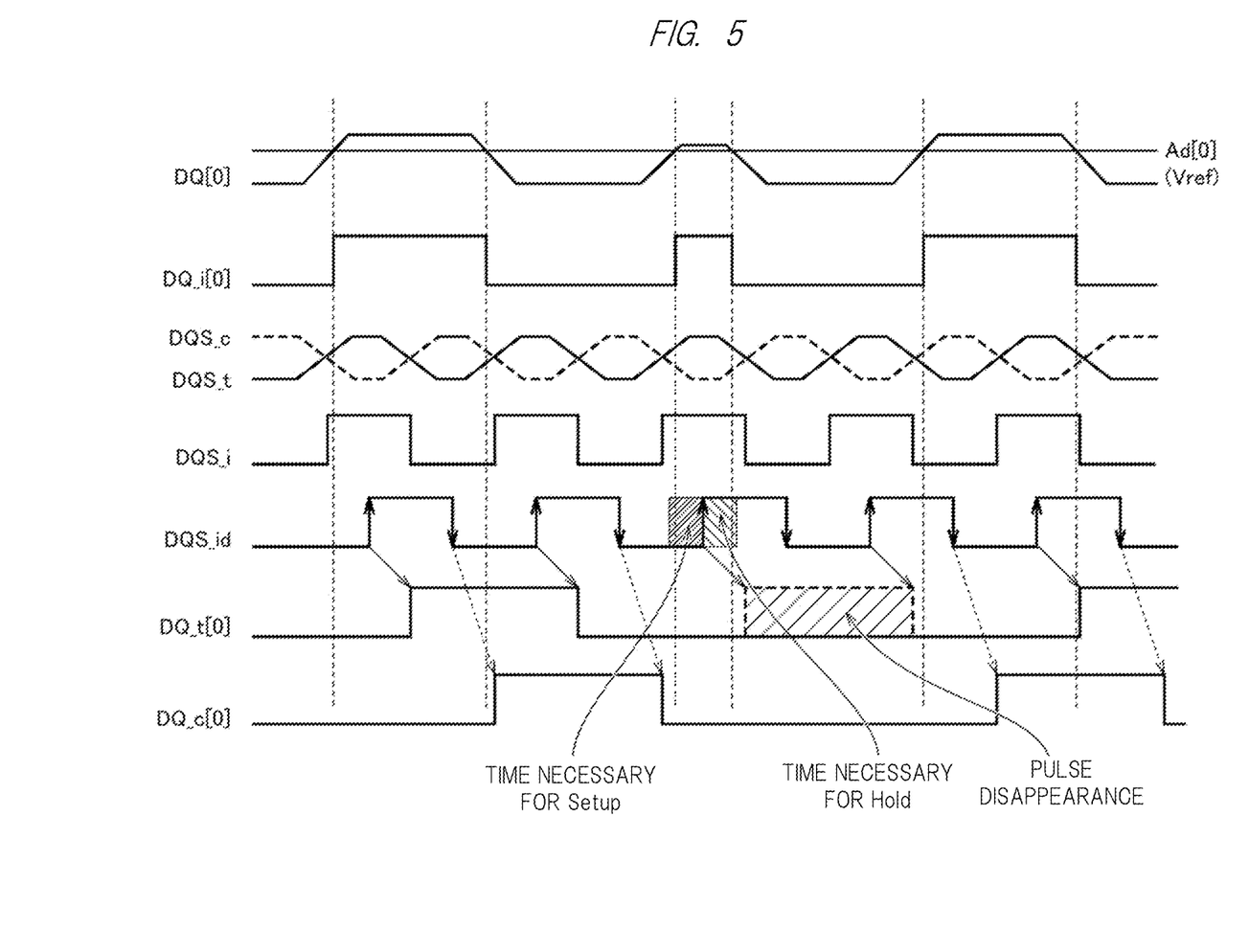
FIG. 5 is a diagram for explaining a problem of the reference example.

FIG. 5 is a diagram for explaining a problem of the reference example.

A first stage shows the data signal DQ[0] inputted to the receiver 3(0) and an analog reference potential Ad[0] obtained by converting the reference potential d[0] stored in the register 2(0) into an analog signal. A second stage shows the binary level data signal DQ_i[0] outputted from the receiver 3(0). A third stage shows the differential data strobe signals DQS_t and DQS_c inputted to the receiver 6. A fourth stage shows the binary level data strobe signal DQS_i[0] outputted from the receiver 6. A fifth stage shows the delayed data strobe signal DQS[0] _id outputted from the delay circuit 57. A sixth stage shows the output signal DQ_t[0] of the rise flip-flop 5a(0). A seventh stage shows the output signal DQ_c[0] of the fall flip-flop 5b(0).

FIG. 5 shows an example in which if the analog reference potential Ad[0] is not set appropriately when the magnitude of DQ[0] fluctuates, a period during which DQ_i[0] is at the high level is shortened and a pulse of DQ_t[0] disappears.

Second Embodiment

Figure 6:
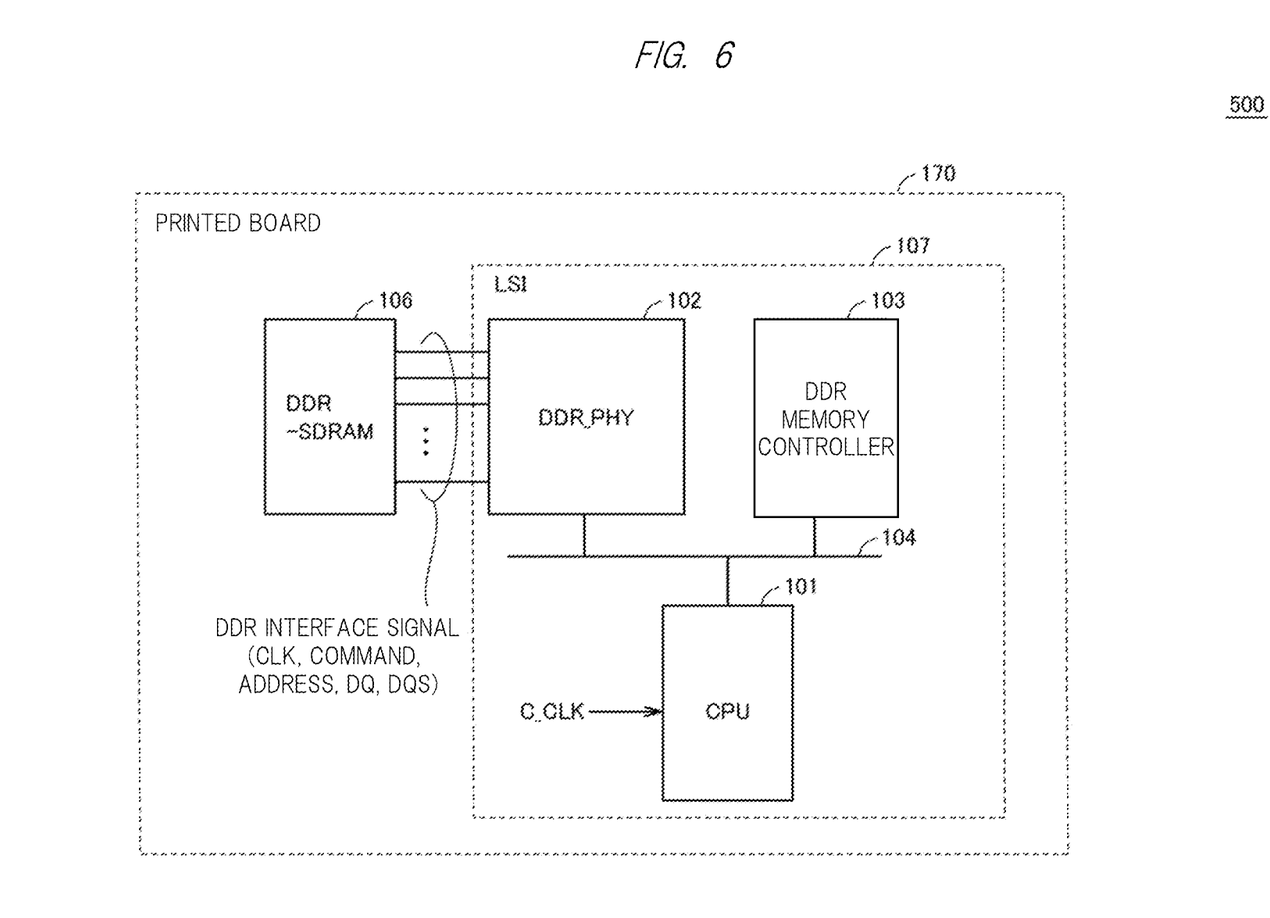
FIG. 6 is a diagram representing a configuration of a semiconductor device 500 according to a second embodiment.

FIG. 6 is a diagram representing a configuration of a semiconductor device 500 according to a second embodiment.

This semiconductor device 500 includes a DDR-SDRAM (Double Data Rate-Synchronous Dynamic Random Access Memory) 106 and a DDR-PHY (DDR-PHYsical Interface) 102. The semiconductor device 500 further includes a DDR memory controller 103.

LSI (Large Scale Integration) 107 and the DDR-SDRAM 106 is arranged on a printed board 170. In the LSI 107, a DDR-PHY 102, a DDR memory controller 103, and a CPU (Central Processing Unit) 101, which are connected by a bus 104, are arranged.

As interface signals between the DDR-PHY 102 and the DDR-SDRAM 106, there are a clock CLK, a command, an address, the data signal DQ, and the differential data strobe signals DQS_t and DQS_c.

The DDR-SDRAM 106 outputs (reads) data and inputs (writes) data at both rising and falling edges of a synchronous clock.

The DDR-PHY 102 converts parallel data from the DDR memory controller 103 into serial data, and transmits it to the DDR-SDRAM 106. The DDR-PHY 102 converts the serial data from the DDR-SDRAM 106 into the parallel data, and transmits it to the DDR memory controller 103.

The DDR memory controller 103 controls the DDR-SDRAM 106.

The CPU 101 operates with a core clock C_CLK. The CPU 101 instructs to read data from the DDR-SDRAM 106, and instructs to write the data to the DDR-SDRAM 106.

Figure 7:
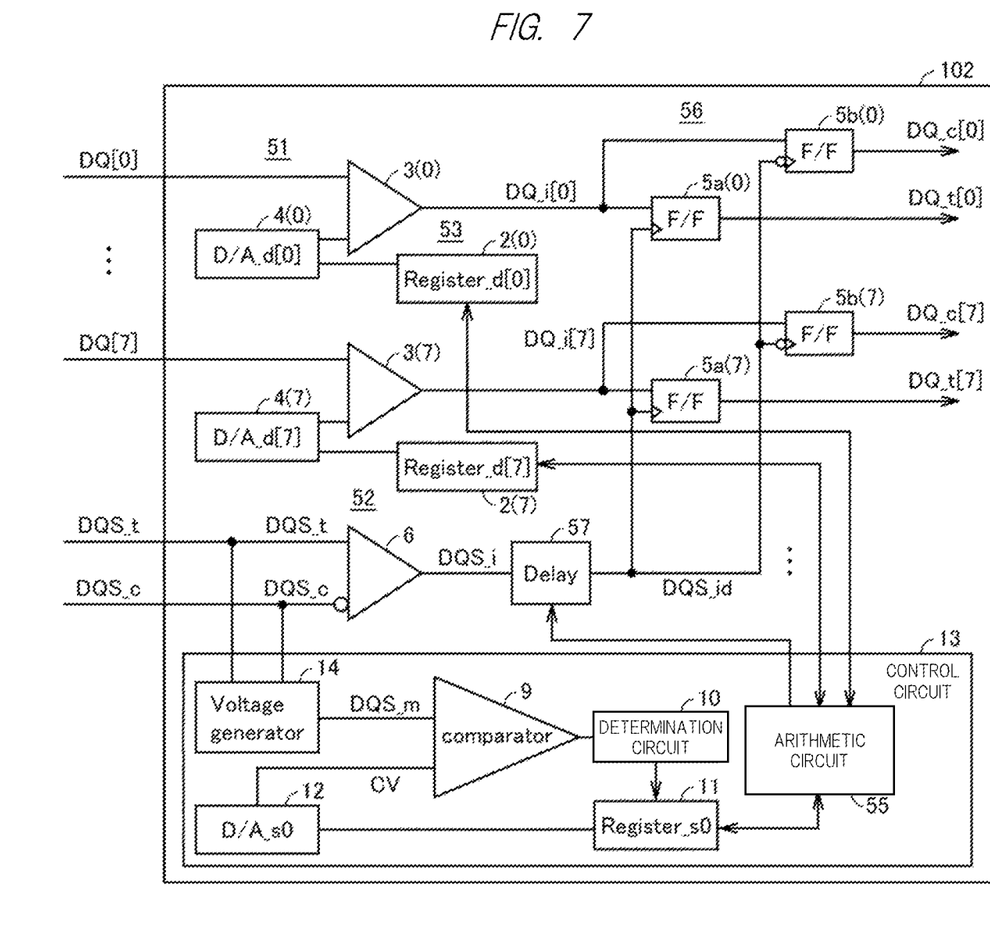
FIG. 7 is a diagram representing a configuration of a DDR-PHY 102 of the second embodiment.

FIG. 7 is a diagram representing a configuration of the DDR-PHY 102 of the second embodiment.

The DDR-PHY 102 includes the data signal reception circuit 51, the data strobe signal reception circuit 52, the delay circuit 57, the reference potential storage unit 53, the control circuit 13, and the data output unit 56.

The reference potential storage unit 53 includes registers 2(0) to 2(7). The register 2(j) stores the reference potential d[0] (j=0 to 7).

The data signal reception circuit 51 includes the D/A conversion circuits 4(0) to 4(7) and the receivers 3(0) to 3(7).

The D/A conversion circuit 4(j) converts the reference potential d[j] in the register 2(j) into the analog reference potential Ad[j] (j=0 to 7).

The receiver 3(j) compares the data signal DQ[j] with the analog reference potential Ad[j]. The receiver 3(j) outputs the binary level data signal DQ_i[j] representing the high level ("1") when the magnitude of the data signal DQ[j] is larger than the magnitude of the analog reference potential Ad[j] (j=0 to 7). The receiver 3(j) outputs the binary level data signal DQ_i[j] representing the low level ("0") when the magnitude of the data signal DQ[j] is smaller than the magnitude of the analog reference potential Ad[j](j=0 to 7).

The data strobe signal reception circuit 52 includes the receiver 6.

The receiver 6 compares the differential data strobe signals DQS_t and DQS_c, and outputs the binary level data strobe signal DQS_i representing the high level ("1") when the magnitude of DQS_t is larger than the magnitude of DQS_c, and representing low level ("0") when the magnitude of DQS_t is smaller than the magnitude of DQS_c.

The delay circuit 57 delays the binary level data strobe signal DQS_i only by the delay amount Delay, and outputs the delayed data strobe signal DQS_id.

The data output unit 56 includes rise flip-flops 5a(0) to 5a(7) and fall flip-flops 5b(0) to 5b(7).

The rise flip-flop 5a(j) latches (samples) the binary level data signal DQ_i[j] at the rising timing of the delayed data strobe signal DQS_id, and outputs DQ_t[j] (j=0 to 7).

The fall flip-flop 5b(j) latches (samples) the binary level data signal DQ_i[j] at the falling timing of the delayed data strobe signal DQS_id, and outputs DQ_c[j] (j=0 to 7).

The control circuit 13 includes an intermediate potential generation circuit 14, a comparator 9, a determination circuit 10, a register 11, a D/A conversion circuit 12, and an arithmetic circuit 55.

The intermediate potential generation circuit 14 generates an intermediate potential DQS_m between the differential data strobe signals DQS_t and DQS_c.

The D/A conversion circuit 12 converts the value stored in the register 11 into the analog signal.

The comparator 9 compares an output signal of the D/A conversion circuit 12 and an output signal DQS_m of the intermediate potential generation circuit 14.

The determination circuit 10 changes the value stored in the register 11 based on the output signal of the comparator 9. The determination circuit 10 reduces the value stored in the register 11 when the output signal of the intermediate potential generation circuit 14 is smaller than the output signal of the D/A conversion circuit 12. The determination circuit 10 increases the value stored in the register 11 when the output signal of the intermediate potential generation circuit 14 is larger than the output signal of the D/A conversion circuit 12.

Finally, the digital value of the intermediate potential DQS_m is stored in the register 11.

The arithmetic circuit 55 stores the intermediate potential DQS_m between one and the other of the differential data strobe signals at the time of the initial training. The arithmetic circuit 55 stores the reference potential adjusted by the initial training.

Figure 8:
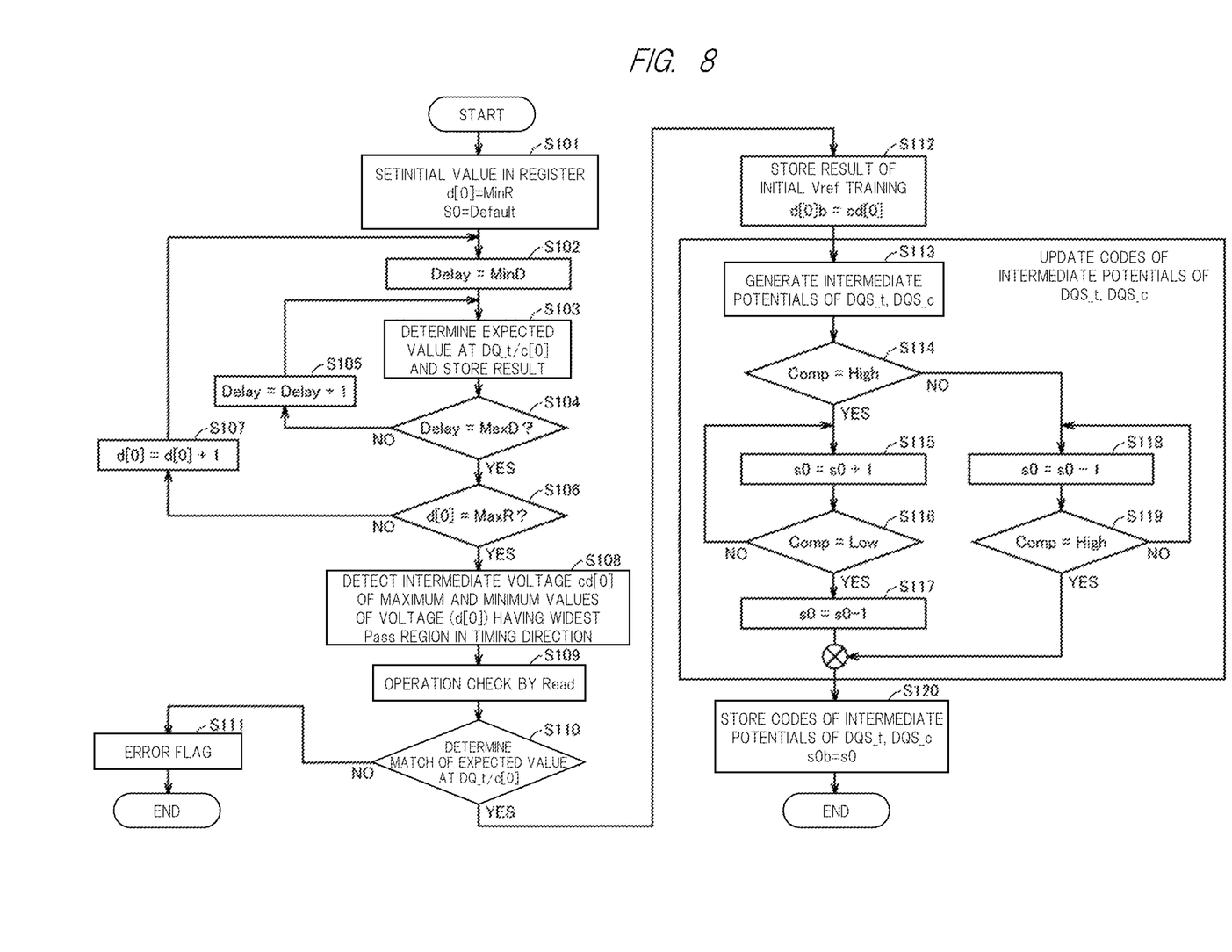
FIG. 8 is a flowchart representing an operation of the DDR-PHY 102 at a time of initial training.

FIG. 8 is a flowchart representing the operation of the DDR-PHY 102 at the time of the initial training. This flowchart relates to an adjustment processing of the reference potential d[0] of the register 2(0), but the adjustment processings of the reference potentials d[1] to d[7] of the registers 2(1) to 2(7) are also similar thereto. These adjustment processings are performed in parallel at the same time.

In step S101, the arithmetic circuit 55 sets the minimum value MinR, which is the initial value, to the reference potential d[0] stored in the register 2(0), and sets a default value Default, which is the initial value, to an intermediate potential s0 stored in the register 11.

In step S102, the arithmetic circuit 55 sets the delay amount Delay of the delay circuit 57 to the minimum value MinD.

In step S103, the arithmetic circuit 55 compares an output DQ_t(0) of the rise flip-flop 5a(0) and an output DQ_c(0) of the fall flip-flop 5b(0) with an expected value. The arithmetic circuit 55 stores Pass together with the set reference potential d[0] and delay amount Delay when a comparison result is a match. The arithmetic circuit 55 stores Fail together with the set reference potential d[0] and delay amount Delay when the comparison result is a mismatch.

In step S104, if the delay amount Delay is the maximum value MaxD, the processing proceeds to step S106 and if the delay amount Delay is not the maximum value MaxD, the processing proceeds to step S105.

In step S105, the arithmetic circuit 55 increments the delay amount Delay of the delay circuit 57. Thereafter, the processing returns to step S103.

In step S106, if the reference potential d[0] is the maximum value MaxR, the processing proceeds to step S108 and if the reference potential d[0] is not the maximum value MaxR, the processing proceeds to step S107.

In step S107, the arithmetic circuit 55 increments the reference potential d[0] stored in the register 2(0). Thereafter, the processing returns to step S102.

Figure 9:
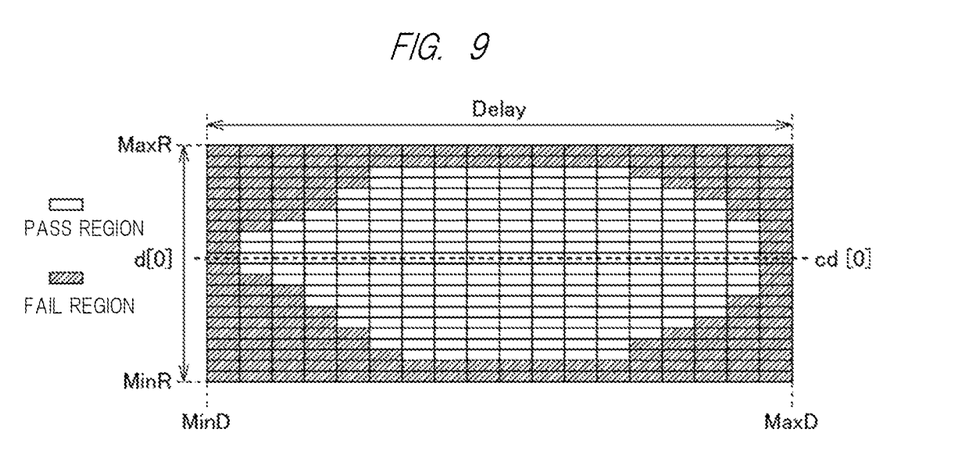
FIG. 9 is a diagram representing an example of a map that defines results corresponding to a reference potential d[0] and a delay amount Delay.

In step S108, the arithmetic circuit 55 creates a map that defines a result (Pass or Fail) corresponding to the reference potential d[0] and the delay amount Delay, as shown in FIG. 9. The arithmetic circuit 55 detects an intermediate voltage cd[0] between the maximum and minimum values of the reference voltage d[0] having the widest Pass region in a direction of the delay amount Delay (timing direction) in the map. This considers a case where the number of reference voltages d[0] having the widest Pass region is two or more. The arithmetic circuit 55 sets the reference potential d[0] of the register 2(0) to the voltage cd[0]. The arithmetic circuit 55 sets the delay amount Delay of the delay circuit 57 to a middle value in a range of the delay amount Delay when the PASS region becomes the widest.

In step S109, the arithmetic circuit 55 causes each component in the DDR-PHY 102 to perform a Read operation on the data stored in the DDR-SDRAM 106.

In step S110, the arithmetic circuit 55 compares the output DQ_t(0) of the rise flip-flop 5a(0) and the output DQ_c(0) of the fall flip-flop 5b(0) with the expected value. If its result is the mismatch, the processing proceeds to step S111 and if the its result is the match, the processing proceeds to step S112.

In step S111, the arithmetic circuit 55 sets an error flag. Thereafter, the processing ends.

In step S112, the arithmetic circuit 55 stores the results of the initial training. That is, the arithmetic circuit 55 stores the voltage cd[0] as d[0]b.

In step S113, the intermediate potential generation circuit 14 generates the intermediate potential DQS_m between DQS_t and DQS_c.

In step S114, the D/A conversion circuit 12 converts the intermediate potential s0 stored in the register 11 into an analog intermediate potential CV. The comparator 9 compares the intermediate potential DQS_m with the intermediate potential CV. If the intermediate potential DQS_m is the intermediate potential CV or more (Comp=High), the processing proceeds to step S115 and if the intermediate potential DQS_m is less than the intermediate potential CV (Comp=Low), the processing proceeds to step S118.

In step S115, the determination circuit 10 increments the intermediate potential s0 stored in the register 11.

In step S116, if the intermediate potential DQS_m is less than the intermediate potential CV (Comp=Low), the processing proceeds to step S117 and if the intermediate potential DQS_m is the intermediate potential CV or more (Comp=High), the processing returns to step S115.

In step S117, the determination circuit 10 decrements the intermediate potential s0 stored in the register 11.

In step S118, the determination circuit 10 decrements the intermediate potential s0 stored in the register 11.

In step S119, if the intermediate potential DQS_m is the intermediate potential CV or more (Comp=High), the processing proceeds to step S120 and if the intermediate potential DQS_m is less than the intermediate potential CV (Comp=Low), the processing returns to step S118.

In step S120, the determination circuit 10 stores the intermediate potential s0 stored in the register 11 as s0b.

Figure 10:
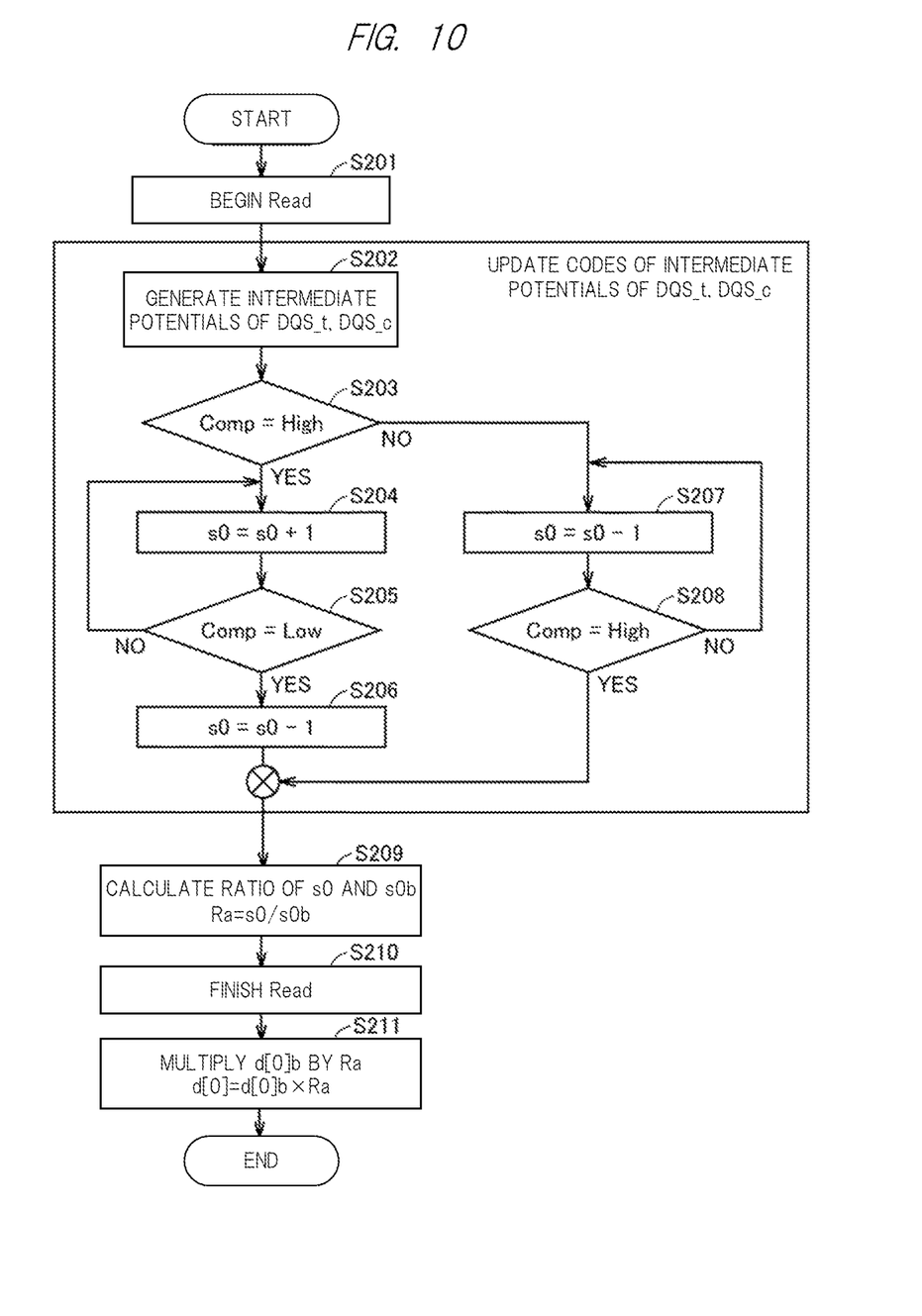
FIG. 10 is a flowchart representing an operation procedure of a DDR-PHY 102 at a time of data reading in the second embodiment.

FIG. 10 is a flowchart representing an operation procedure of the DDR-PHY 102 at the time of the data reading in the second embodiment.

In step S201, the arithmetic circuit 55 causes each component in the DDR-PHY 102 to begin a Read operation.

In step S202, the intermediate potential generation circuit 14 generates the intermediate potential DQS_m between DQS_t and DQS_c.

In step S203, the D/A conversion circuit 12 converts the intermediate potential s0 stored in the register 11 into the analog intermediate potential CV. The comparator 9 compares the intermediate potential DQS_m with the intermediate potential CV. If the intermediate potential DQS_m is the intermediate potential CV or more (Comp=High), the processing proceeds to step S204 and if the intermediate potential DQS_m is less than the intermediate potential CV (Comp=Low), the processing proceeds to step S207.

In step S204, the determination circuit 10 increments the intermediate potential s0 stored in the register 11.

In step S205, if the intermediate potential DQS_m is less than the intermediate potential CV (Comp=Low), the processing proceeds to step S206 and if the intermediate potential DQS_m is the intermediate potential CV or more (Comp=High), the processing returns to step S204.

In step S206, the determination circuit 10 decrements the intermediate potential s0 stored in the register 11.

In step S207, the determination circuit 10 decrements the intermediate potential s0 stored in the register 11.

In step S208, if the intermediate potential DQS_m is the intermediate potential CV or more (Comp=High), the processing proceeds to step S209 and if the intermediate potential DQS_m is less than the intermediate potential CV (Comp=Low), the processing returns to step S207.

In step S209, the arithmetic circuit 55 calculates a ratio Ra between the intermediate potential s0 stored in the register 11 and an intermediate potential s0b stored in the arithmetic circuit 55.

$$Ra = s0/s0b \quad (1)$$

In step S210, the arithmetic circuit 55 causes each component in the DDR-PHY 102 to finish the Read operation.

In step S211, the arithmetic circuit 55 calculates an updated value d[0] of the reference potential by multiplying the reference potential d[0]b stored in the arithmetic circuit 55 by the ratio Ra.

$$d[0] = Ra \times d[0]b \quad (2)$$

The arithmetic circuit 55 updates the reference potential of the register 2(0) with the updated value d[0].

FIG. 11A to 11E are diagrams for each explaining an example in which the reference potential d[i] in the register 2(i) is updated.

Figure 11A:
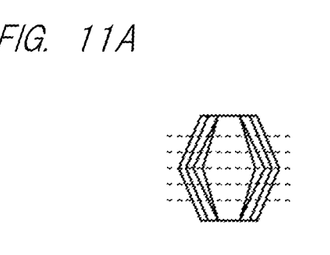

FIG. 11A is a diagram showing the window of the data signal DQ at a time of an initial training operation. The optimum reference potential is searched. The optimum reference potential d[i]b is stored in the register 2(i) and the arithmetic circuit 55.

Figure 11B:
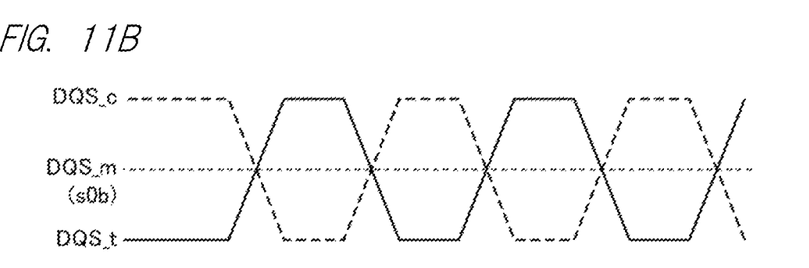

As shown in FIG. 11B, the intermediate potential DQS_m of the differential data strobe signal detected at the time of the initial training operation is stored in the arithmetic circuit 55 as s0b.

Figure 11C:
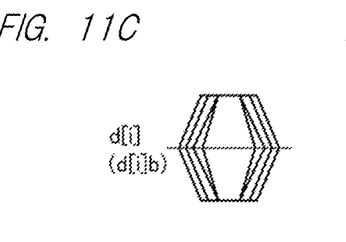

FIG. 11C represents the reference potential set immediately after the initial training. At this time, d[i]b=d[i].

Figure 11D:
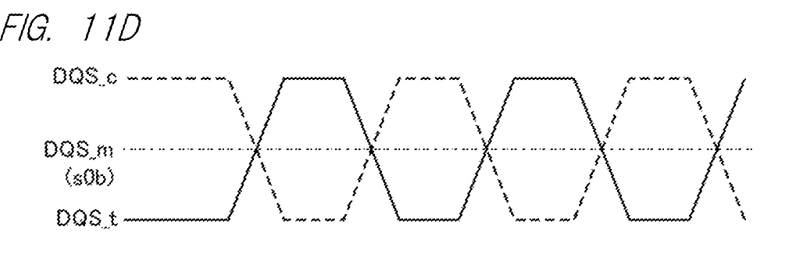

FIG. 11D represents the intermediate potential DQS_m of the differential data strobe signal immediately after the initial training.

Figure 11E:
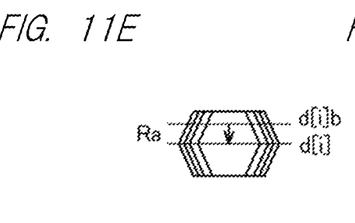
Figure 11F:
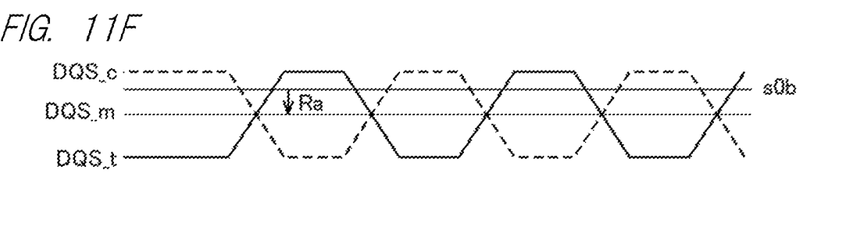

FIG. 11F represents a change in the intermediate potential of the differential data strobe signal after a certain period of time. The ratio Ra between the current intermediate potential DQS_m and the stored intermediate potential s0b is calculated.

In FIG. 11E, the reference potential d[i] stored in the register 2(i) is updated from d[i]b to Ra×d[i]b.

Third Embodiment

Figure 12:
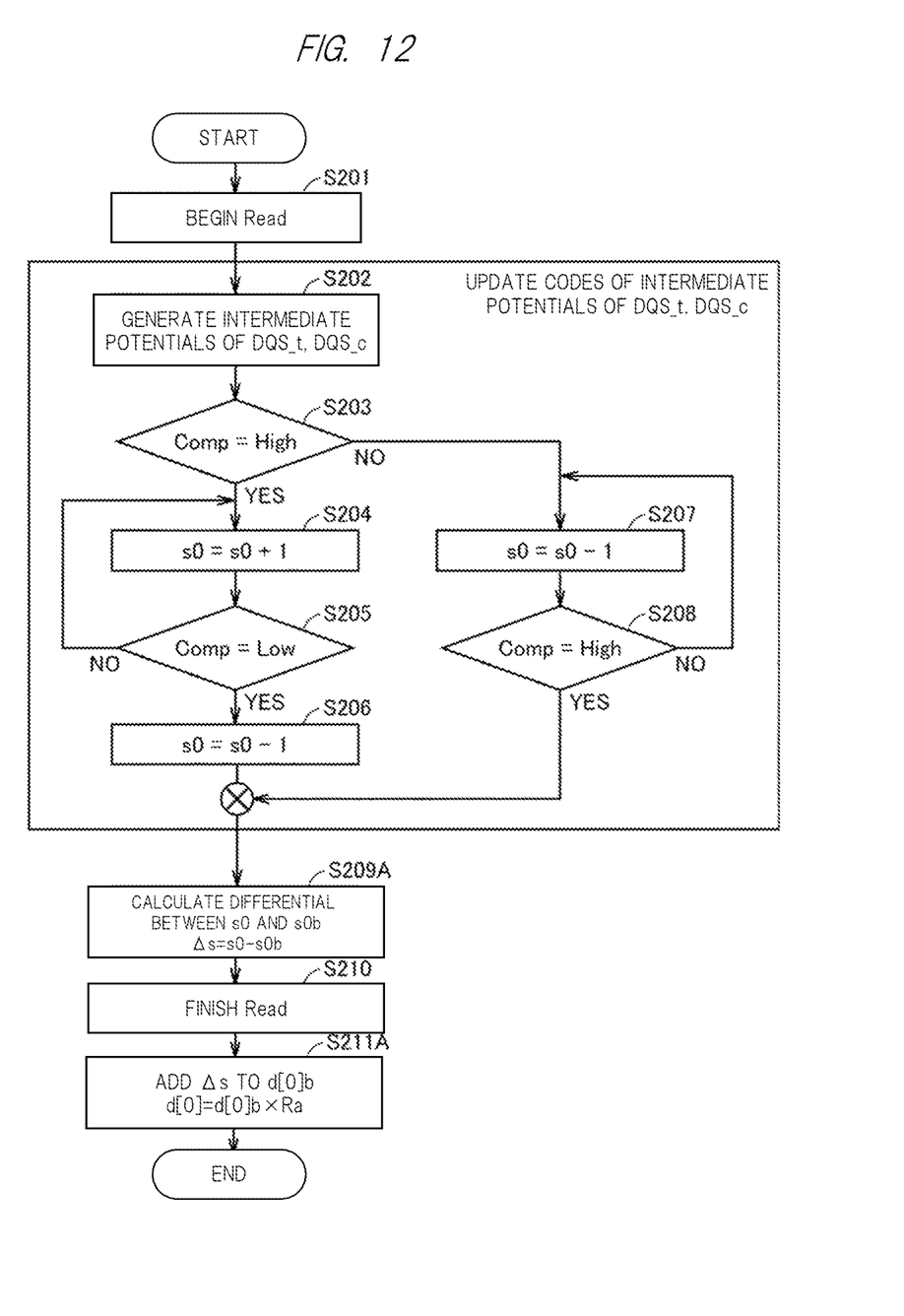
FIG. 12 is a flowchart representing an operation procedure of a DDR-PHY 102 at a time of data reading in a third embodiment.

FIG. 12 is a flowchart representing an operation procedure of the DDR-PHY 102 at the time of the data reading in a third embodiment.

A difference between the flowchart of FIG. 12 and the flowchart of the second embodiment of FIG. 10 is that the flowchart of FIG. 12 includes steps S209A and S211A instead of steps S209 and S211.

In step S209A, the arithmetic circuit 55 calculates a difference Δs between the intermediate potential s0 stored in the register 11 and the intermediate potential s0b stored in the arithmetic circuit 55.

$$\Delta s = s0 - s0b \quad (1A)$$

In step S211A, the arithmetic circuit 55 calculates the updated value d[0] of the reference potential by adding the reference potential d[0]b stored in the arithmetic circuit 55 to the difference Δs.

$$d[0] = d[0]b + \Delta s \quad (2A)$$

The arithmetic circuit 55 updates the reference potential of the register 2(0) with the updated value d[0].

Fourth Embodiment

In the present embodiment, the control circuit 13 adjusts the reference potential by the initial training, and causes the reference potential storage unit 53 to store the adjusted reference potential. The control circuit 13 updates the reference potential stored in the reference potential storage unit 53 based on the intermediate potential between one and the other of the one previous differential data strobe signals and the intermediate potential between the one and the other of the current differential data strobe signals at the time of the data reading.

Figure 13:
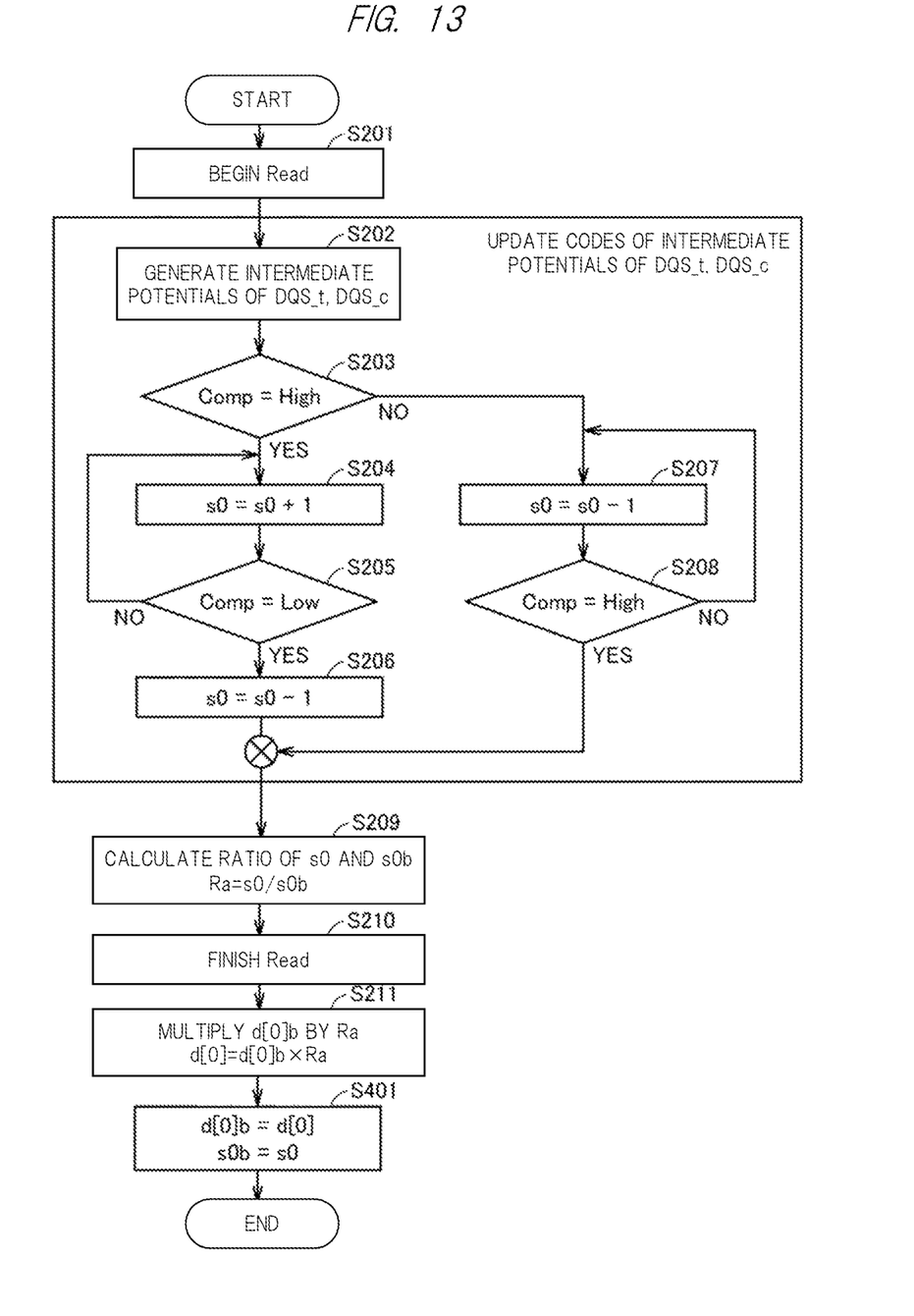
FIG. 13 is a flowchart representing an operation procedure of a DDR-PHY 102 at a time of data reading in a fourth embodiment.

FIG. 13 is a flowchart showing an operation procedure of a DDR-PHY 102 at a time of the date reading in a fourth embodiment.

A difference between the flowchart of FIG. 13 and the flowchart of the second embodiment of FIG. 10 is that the flowchart of FIG. 13 includes step S401.

In step S401, the arithmetic circuit 55 updates the intermediate potential s0b stored in the arithmetic circuit 55 by s0 calculated in steps S202 to S206.

The arithmetic circuit 55 updates the reference potential d[0]b stored in the arithmetic circuit 55 by d[0] calculated in step S211.

Consequently, in the second and subsequent Read operations, instead of using the reference potential of the data signal DQ and the intermediate potential of the differential data strobe signal which are obtained by the initial training for comparison with the current value, the reference potential of the data signal DQ and the intermediate potential of the differential data strobe signals, which are updated in the one previous Read operation, are used.

The invention made by the present inventor(s) has been specifically described above based on the embodiments, but the present invention is not limited to the embodiments and, needless to say, can variously be modified without departing from the scope of the invention.

What is claimed is:

1. A semiconductor device comprising:
a reference potential storage unit storing a reference potential of a data signal;
a data signal reception circuit outputting a binary level data signal by comparing the data signal with the reference potential stored in the reference potential storage unit;
a data strobe signal reception circuit outputting a binary level data strobe signal by comparing one and the other of differential data strobe signals;
a data output unit sampling an output signal of the data signal reception circuit based on an output signal of the data strobe signal reception circuit; and
a control circuit adjusting the reference potential by initial training, causing the reference potential storage unit to store the adjusted reference potential, and updating the reference potential stored in the reference potential storage unit based on an intermediate potential between one and the other of the differential data strobe signals at a time of initial training and an intermediate potential between one and the other of differential data strobe signals at a time of data reading.

2. The semiconductor device according to claim 1,
wherein the control circuit updates the reference potential stored in the reference potential storage unit by a multiplication result of a ratio and the reference potential adjusted by the initial training, the ratio being a ratio between the intermediate potential between one and the other of the differential data strobe signals at the initial training and the intermediate potential between one and the other of the differential data strobe signals at the time of the data reading.

3. The semiconductor device according to claim 1,
wherein the control circuit updates the reference potential stored in the reference potential storage unit by an addition result of a difference and the reference potential adjusted by the initial training, the difference being a difference between the intermediate potential between one and the other of the differential data strobe signals at the time of the initial training and the intermediate potential between the one and the other of the differential data strobe signals at the time of the data reading.

4. The semiconductor device according to claim 1,
wherein the control circuit includes:
an intermediate potential generation circuit generating the intermediate potential between one and the other of the differential data strobe signals.

5. The semiconductor device according to claim 4,
wherein the control circuit includes:
a register;
a D/A conversion circuit converting a value stored in the register into an analog signal;
a comparator comparing an output signal of the D/A conversion circuit and an output signal of the intermediate potential generation circuit; and
a determination circuit changing the value stored in the register based on an output signal of the comparator.

6. The semiconductor device according to claim 5,
wherein the determination circuit:

decreases the value stored in the register when the output signal of the intermediate potential generation circuit is smaller than the output signal of the D/A conversion circuit; and increases the value stored in the register when the output signal of the intermediate potential generation circuit is larger than the output signal of the D/A conversion circuit.

7. The semiconductor device according to claim 1, further comprising a delay circuit delaying the binary level data strobe signal only by a delay amount, wherein the data output unit samples the output signal of the data signal reception circuit based on an output signal of the delay circuit, and wherein the control circuit adjusts the delay amount by the initial training.

8. The semiconductor device according to claim 1, wherein the control circuit stores the intermediate potential between one and the other of the differential data strobe signals at the time of the initial training.

9. The semiconductor device according to claim 8, wherein the control circuit stores the reference potential adjusted by the initial training.

10. A semiconductor device comprising:

a reference potential storage unit storing a reference potential of a data signal;

a data signal reception circuit outputting a binary level data signal by comparing the data signal with the reference potential stored in the reference potential storage unit;

a data strobe signal reception circuit outputting a binary level data strobe signal by comparing one and the other of differential data strobe signals;

a data output unit sampling an output signal of the data signal reception circuit based on an output signal of the data strobe signal reception circuit; and a control circuit adjusting the reference potential by initial training, causing the reference potential storage unit to store the adjusted reference potential, and updating the reference potential stored in the reference potential storage unit based on an intermediate potential between one side and the other of a one previous differential data strobe signals and an intermediate potential between one and the other of current differential data strobe signals at a time of data reading.

11. A control method for a semiconductor device, the semiconductor device comprising:

a reference potential storage unit storing a reference potential of a data signal;

a data signal reception circuit outputting a binary level data signal by comparing the data signal with the reference potential stored in the reference potential storage unit;

a data strobe signal reception circuit outputting a binary level data strobe signal by comparing one and the other of differential data strobe signals;

a delay circuit delaying the binary level data strobe signal only by a delay amount;

a data output unit sampling an output signal of the data signal reception circuit based on an output signal of the delay circuit; and a control circuit, the control method comprising:

the control circuit adjusting the reference potential and the delay amount by an initial training;

the control circuit causing the reference potential storage unit to store the adjusted reference potential;

the control circuit storing the intermediate potential between one and the other of the differential data strobe signals at the time of the initial training; and the control circuit updating the reference potential stored in the reference potential storage unit based on the intermediate potential between one and the other of store differential data strobe signals at the time of the initial training and the intermediate potential between the one and the other of the stored differential data strobe signals at the time of the data reading.

12. The control method for a semiconductor device according to claim 11, wherein the updating includes the control circuit updating the reference potential stored in the reference potential storage unit by a multiplication result of a ratio and the intermediate potential adjusted at the time of the initial training, the ratio being a ratio of the intermediate potential between one and the other of the stored differential data strobe signals at the time of the initial training and the reference potential between one and the other of the stored differential data strobe signals at the time of the data reading.

13. The control method for a semiconductor device according to claim 11, wherein the updating includes the control circuit updating the reference potential stored in the reference potential storage unit by an addition result of a difference and the reference potential adjusted by the initial training, the difference being a difference between the intermediate potential between one and the other of the stored differential data strobe signals at the time of the initial training and the intermediate potential between one and the other of the stored differential data strobe signals at the time of the data reading.

* * * * *